United States Patent [19]

Shemer et al.

[11] 4,230,738

[45] Oct. 28, 1980

[54] PROCESS FOR PREPARING TEXTURED PROTEIN CONCENTRATE

[75] Inventors: Michael Shemer, Haifa, Israel; Richard E. McDonald, Westerville; Anthony H. Chen, Columbus, both of Ohio

[73] Assignee: Miles Laboratories, Inc., Elkhart, Ind.

[21] Appl. No.: 735,002

[22] Filed: Oct. 22, 1976

Related U.S. Application Data

[63] Continuation-in-part of Ser. No. 613,090, Sep. 15, 1975, abandoned.

[51] Int. Cl.² .............................................. A23J 3/00
[52] U.S. Cl. .................................... 426/656; 426/657; 426/802; 426/431
[58] Field of Search ............... 426/104, 656, 657, 431, 426/436, 437, 802

[56] References Cited

U.S. PATENT DOCUMENTS

| | | | |
|---|---|---|---|
| 3,142,571 | 7/1964 | McAnelly | 426/431 X |
| 3,488,770 | 1/1970 | Atkinson | 426/656 X |
| 3,870,805 | 3/1975 | Hayes et al. | 426/431 |
| 3,912,824 | 10/1975 | Spiel | 426/656 X |
| 3,939,284 | 2/1976 | Akin et al. | 426/657 X |
| 3,966,977 | 6/1976 | Levinson et al. | 426/802 X |

*Primary Examiner*—Esther M. Kepplinger
*Attorney, Agent, or Firm*—Richard W. Winchell

[57] ABSTRACT

A process is provided for the preparation of a textured protein concentrate which has improved meat-like texture and bland flavor. The basic process utilized includes aqueous solvent extraction of water soluble constituents from protein extrudate containing such constituents, and the present invention provides an improvement in said basic process which comprises utilizing a protein extrudate having a density of between about 85 to 150 grams per liter on a dry weight basis and extraction at pH between about 4.4 and 6.0. Using an aqueous extraction at a pH between about 5.0 and 6.0, the textured protein concentrate has a texture similar to the tender lean portions of beef, pork, poultry or shellfish. Using an aqueous extraction at a pH between about 4.4 and 5.0, the textured protein concentrate has a texture similar to fish.

11 Claims, No Drawings

PROCESS FOR PREPARING TEXTURED PROTEIN CONCENTRATE

CROSS REFERENCE TO RELATED APPLICATION

This Application is a continuation-in-part of copending U.S. Pat. application Ser. No. 613,090, filed Sept. 15, 1975 now abandoned.

BACKGROUND AND PRIOR ART

During recent years, food scientists have devoted much of their time to developing methods for preparing acceptable meat-like food products, such as beef, pork, poultry, fish, shellfish analogs and extenders and the like, from a wide variety of secondary plant and animal sources. To be acceptable, a food product must be both bland and have a meat-like texture. One such method involves extrusion of a moist proteinaceous material in the form of a plastic mass, under elevated conditions of temperature and pressure, through an orifice into a region of lower pressure to form an expanded porous protein-containing product. This general method is exemplified by the processes of U.S. Pat. Nos. 3,102,031; 3,480,442; 3,488,770 and 3,812,267. Protein extrudate products thus obtained are characterized by their tough, resilient, expanded, open-cellular, rope-like structure made up of interlaced, interconnected pores and channels of varying width and thickness having a bulk density of about 220 to 1500 grams per liter on a weight basis when dried to less than 10 percent moisture. When these protein extrudates are properly hydrated, for instance in boiling water, they will absorb several times their dry weight in liquid and develop a chewy texture somewhat similar to cooked lean meat. Such hydrated products have been used extensively as a partial meat replacement in such food products as chili, stew, meatloaf and the like.

Although these extrusion products represent a significant advance in the art, they do possess several inherent qualities, such as uneven texture and undesirable organoleptic properties, which have limited their general use as a total replacement for real meat proteins, especially where it is desired to simulate the texture of natural lean portions such as beef, pork, poultry, fish or shellfish. For example, it is known in the extrusion art that desirable meat-like texture is dependent upon the degree of protein expansion and the amount of water absorbed by the extrudate during hydration. Protein extrudates which are overly expanded, i.e., those having a bulk density much below about 220 grams per liter on a dry weight basis, are generally regarded as having, when hydrated, a spongy or very porous structure which is too soft to resemble meat. Conversely, a product which has not been sufficiently expanded is too hard and dense to resemble meat. Due to the porous expanded structure of the extrudates, they have the ability to absorb large amounts of water and this creates a problem of moisture control. A protein extrudate which contains too much water is normally too mushy, and a protein extrudate which contains too little water is normally too tough to resemble meat. Unfortunately, it is difficult to control the moisture content of the hydrated extrudates, and the products which result are not totally satisfactory in their meat-like texture.

In addition to the above textural defects, the protein extrudates prepared from crude proteinaceous materials inherently contain undesirable water soluble constituents, such as carbohydrates, salts, flavor and odor components, which are not normally associated with cooked meat products. One means of eliminating these objectionable materials is to extensively purify the proteinaceous starting materials prior to the preparation of the protein extrudates. This prior processing, however, is costly, time consuming and results in loss of valuable proteins.

Some of these flavor problems can be obviated by the water extraction procedures described in U.S. Pat. Nos. 3,142,571 and 3,870,805. These procedures take advantage of the fact that the protein, following a cooking step such as by pressure cooking or by extrusion, is denatured and relatively water insoluble. Thus, the objectionable water soluble materials mentioned above, which are trapped within the extrudates' interstitial spaces or pores, can be partially removed therefrom by aqueous extraction without serious loss of the protein. Removing water soluble materials desirably increases the extrudates' relative protein content to at least about 70 percent on a dry weight basis and allows the extracted protein extrudate to be classified as a textured protein concentrate. However, due to the relatively dense nature of the porous protein extrudates which has been essential to development of meat-like texture, it has not previously been possible to completely remove all undesirable water soluble components, and the resulting products have therefore not been completely bland. In addition, the water content of these hydrated, water extracted protein extrudates is difficult to control without costly and time consuming mechanical water adjusting means and the texture thereof is usually either too tough or too soft to closely resemble real meat.

SUMMARY OF THE INVENTION

It is therefore considered highly desirable to employ a low cost efficient process to provide an acceptable textured protein product without the inherent disadvantages of the prior art processes described above.

In accordance with the present invention, a novel process is provided for the preparation of a textured protein concentrate product which has improved meat-like texture and bland flavor. The basic process utilized includes aqueous solvent extraction of water soluble constituents from protein extrudate containing such constituents and the present invention provides an improvement in said basic process which comprises utilizing a protein extrudate having a density of about 85 to 150 grams per liter on a dry weight basis and extraction at a pH between about 4.4 and 6.0. Textures resembling tender lean portions of beef, pork, poultry or shellfish can be preferentially obtained by extracting the extrudates at a pH between about 5.0 and 6.0. Textures resembling fish can be preferentially obtained by extracting the extrudate at a pH between about 4.4 and 5.0.

DESCRIPTION OF THE INVENTION

The protein extrudate useful in this invention may be in the form of pieces or chunks which are generally regarded as overly expanded products having a bulk density of between about 85 and 150 grams per liter on a dry weight basis after drying to less than 8 percent moisture. Preferably the density will be between about 90 and 115 grams per liter on a dry weight basis. Much above about 150 grams per liter, the hydrated aqueous extracted protein extrudates are inherently too dense, and water soluble constituents cannot be effectively removed. Below about 85 grams per liter, the extrudate products possess little, if any, meat-like texture.

Useful protein extrudate may be prepared from crude proteinaceous materials containing on a weight basis about 35 to 80 percent protein and about 15 to 50 percent of other water soluble constituents, such as carbohydrates, salts, flavor and odor components. The proteinaceous materials may be obtained from both plant and animal sources including oleaginous seeds, microbial and yeast ferments, cereal grains, mixtures thereof and the like. Solvent extracted leguminous seed materials, such as hexane defatted soybean materials, are particularly satisfactory.

The proteinaceous material is admixed with about 9 to 18 percent of added water on a weight basis to form a moist proteinaceous mixture. Preferably, the added water will amount to about 11 to 16 percent on a weight basis. The moist mixture is then passed through a cooker-extruder equipped with a 50 horespower motor, at a feedrate of about 200 to 400 pounds of proteinaceous material per hour and preferably from 250 to 350 pounds of proteinaceous material per hour, while being subjected to elevated conditions of temperature and pressure in the extruder, and is forced out of the extruder through a die orifice into a substantially atmospheric temperature and pressure environment. Feedrates may be correspondingly adjusted for extruders equipped with different horespower ratings, as is well known by those skilled in the art. The temperature in the extruder will usually vary between about 100° C. to 165° C. at the die. Preferably, the temperature will be between about 115° C. and 140° C. at the die. Pressures that may be employed at the die are in the range of 100 psi to 300 psi. As the extrudate emerges from the extruder's die orifice into the environment of lower pressure, the water therein becomes highly volatile and flashes off, causing the extrudate, as measured in cross section, to expand by 20 to 300 percent and to partially dehydrate. The extrudate is then cut into pieces or chunks of about 1 to 2.5 inches in length, by a rotating cutter located adjacent the extruder's die orifice.

To remove a major portion of the water soluble constituents from the protein extrudate pieces produced as described above, they are contacted with an aqueous solvent having a pH between about 4.4 and 6.0. Using these pH extraction conditions, the aqueous solvent-contacted protein extrudate emerges after the aqueous solvent extraction step containing about 80 to 87 percent moisture and at least about 70 percent protein on a dry weight basis to provide a textured protein concentrate product with improved meat-like texture and a bland flavor. A protein concentrate is defined in the art as a protein product containing at least about 60 to 70 percent protein. At a pH much above about pH 6.0, the protein extrudate of this invention develops a soft mushy texture and an excess moisture content of about 88 to 90 percent. At a pH between about 5.0 and 6.0, preferably a pH between 5.4 and 5.9, the protein extrudate develops a desirable texture similar to the lean portions of beef, pork, poultry or shellfish. At a pH between about 4.4 and 5.0, preferably a pH between about 4.4 and 4.8 the protein extrudate develops a desirable texture similar to fish. At a pH much below about pH 4.4, the protein extrudate develops an undesirable rubbery, tough, chewy texture with an extremely dry woody mouthfeel. The acid pH of the aqueous solvent is maintained by the addition of any suitable acid such as citric, hydrochloric, phosphoric, sulfuric and the like. Suitable acid buffers or acid salts may also be used as long as they do not adversely affect the taste or texture of the protein product.

In order to effectively remove particularly troublesome water soluble constituents such as carbohydrates and flavors, the temperature of the aqeuous solvent used to contact the protein extrudate pieces should be above about 65° C. Preferably the temperature will be above about 85° C.

It will be appreciated by those skilled in the art that the above extraction step can be practiced as a batch or as a continuous process. The concentration of materials and contact times will be dependent upon the mode selected. Thus, for example, in a batch process, a concentration ratio of about 20 parts of aqeuous solvent to one part of protein extrudate, on a weight basis, has been used successfully. Preferably the protein extrudate will be contacted, in a batch process, with fresh aqueous solvent in at least two stages with one stage of at least about 8 to 1 parts of aqueous solvent to protein extrudate solids, and a second stage of at least about 15 to 1 parts of aqueous solvent to protein extrudate solids on a weight basis. In a continuous process, such as in a continuous countercurrent multistage extraction process, it is possible to reduce the ratio of aqueous solvent to protein extrudate to at least about 8 to 1 on a weight basis and still achieve good extraction efficiency.

Using the above described temperature and concentration conditions, contact times as low as 20 minutes have been used successfully in a batch process. Longer contact times may be desirable to improve the extraction of particularly troublesome water soluble constituents. In either the batch process or the continuous process, the contact time in each stage can be reduced by increasing the number of contact stages.

It has been consistently observed with the relatively dense prior art protein extrudates that it is necessary to contact the extrudates with an aqueous solvent at a pH above 6.0 to produce products with somewhat acceptable texture. At a pH below 6.0, these extrudates develop unacceptable, rubbery, tough, chewy textures and dry mouthfeel qualities. However, even at a pH above 6.0, it is difficult to control the moisture content of these products without costly and time consuming water adjusting means. From what is known of the prior art and experience with relatively dense protein extrudates, it was indeed surprising to find that products could be prepared which have improved meat-like texture and extremely bland flavor using the overly expanded, relatively light, protein extrudate of this invention. When the protein extrudate of this invention is contacted with an aqueous solvent at a pH above 6.0, the products are too soft and mushy to resemble meat. In the pH range from about 5.0 to 6.0, however, the products of this invention have desirable decreased water retention properties, desirable texture resembling beef, pork, poultry or shellfish and can be conveniently maintained by this process at about 85 to 87 percent moisture by weight, without costly mechanical water adjusting means. In the pH range from about 4.4 to 5.0, the products of this invention have desirable texture resembling fish, especially tuna, and can be conveniently maintained by this process at about 82 to 86 percent moisture by weight, without costly mechanical water adjusting means. As a result, these novel products can be combined, as is, with various flavoring ingredients, binders, colors and other additives to completely replace meat in many types of meat analogs. Due to the stress conditions applied to the products during normal mixing, the textured protein concentrate products of the present invention are inherently shredded or ruptured to provide a plurality of fibrous-like masses which possess a desirable texture similar to real meat. Such products are useful in preparing hamburger-like meat patties, sausages, meatloafs, lean sirloin, chicken loaf, lean pork, tuna-fish cakes, shellfish-cakes and the like.

In order to further illustrate the novel aspects of the present invention, the following examples are presented. It should be recognized that these examples are provided by way of illustration only and are not intended to limit in any way the invention disclosed herein.

EXAMPLE 1

This example illustrates a typical preparation of protein extrudate from soybean materials and the preparation of textured protein concentrate therefrom using the instant extraction process.

Commerically available defatted soybean flour from which the oil had been hexane extracted and which contained about 50 percent by weight protein and about 35 percent of water soluble components was mixed with about 16 percent by weight of added water to form a moist proteinaceous mixture. This moist mixture was then continuously, at a rate of about 290 pounds of defatted soybean flour per hour, passed through a Wenger X-25 cooker-extruder equipped with a 50 hp motor and a three hole die, each opening having an orifice diameter of about ⅜ inch with a length to diameter ratio of 4.0. As the material passed through the cooker-extruder, it was subjected, near the discharge die end, to a temperature of about 115° C. and to a pressure of about 180 to 250 psi and was discharged from the extruder's die orifices into a substantially atmospheric environment. The extrudate emerged as a continuous expanded rope of proteinaceous material having a very porous, open-cellular texture. The expanded extrudate was then cut into about 1.5 inch pieces or chunks by a rotating cutter located adjacent to the extruder's discharge end. The extrudate pieces were about 0.6 to 0.7 inch in diameter and had a bulk density of between about 104 to 123 grams per liter at a moisture content of less than 8 percent by weight.

About 15 pounds of the protein extrudate pieces, prepared as described above, were placed in a large open kettle and were then contacted with an aqueous solvent by adding to the protein extrudate about 120 pounds of water (which corresponds to an aqueous solvent to solids ratio of about 8 to 1 on a weight basis) and about 550 ml of 10 percent by weight phosphoric acid. The pH of the mixture was about 5.7. The mixture was gently agitated for about 20 minutes at 85° C. and the water was drained from the extrudate. About 170 pounds of fresh water was then added to the drained extrudate (which corresponds to an aqueous solvent to solids ratio of about 15 to 1 on a weight basis) and maintained at 85° C. for 45 minutes at pH 5.7, by the addition of a suitable acid if necessary, under gentle stirring conditions and the water was drained from the extrudate pieces. To reduce the temperature of the extrudate an additional 170 pounds of cold tap water at 18° C. was added to the extrudate and drained away after about 5 minutes to provide a textured protein product which contained about 85 to 86 percent moisture and about 70 percent protein on a dry weight basis. The textured protein concentrate so prepared was structually similar, in size and shape, to the protein extrudate starting material, before the aqueous extraction step, but had a resilient, pliable, more open-cellular, fibrous texture. When placed in the mouth and masticated, the textured protein concentrate of this example had an excellent chewy, meat-like texture resembling the texture of tender, lean cuts of beef, pork, poultry or shellfish and a bland flavor.

A hamburger analog patty mix was prepared from the above textured protein concentrate by combining the following ingredients:

1000 grams textured protein concentrate;
60 grams proteinaceous binder (such as egg albumin); and
180 grams flavors, seasoning, fats and color.

These ingredients were mixed well and made into patties and fried at about 176° C. until cooked. These products were then compared with natural hamburger and cubed steak fried in a similar fashion. The products of this invention had a texture which was closely similar to natural hamburger.

EXAMPLE 2

This example illustrates the preparation of protein extrudates of different bulk densities and the effect of bulk density on the moisture content, shear strength and mouthfeel of the textured protein concentrate.

Protein extrudates of varying bulk density were prepared from defatted soybean flour containing by weight about 50 percent undenatured protein, about 20 percent water soluble constituents and about 7 percent moisture in a manner similar to Example 1 using the following extrusion conditions.

| Sample | Feed Rate lbs/hr | % Moisture Added | Die Temp °C. | Die Press psi | Bulk Density[1] grams/liter |
|---|---|---|---|---|---|
| 1 | 250 | 15.4 | 119 | 160 | 114 |
| 2 | 250 | 12.4 | 118 | 130 | 110 |
| 3 | 310 | 12.8 | 140 | 200 | 96 |
| 4 | 310 | 12.4 | 116 | 190 | 92 |
| 5 | 350 | 11.8 | 138 | 270 | 112 |
| 6 | 350 | 9.1 | 135 | 150 | 102 |

[1]All extrudates were dried to less than 8% moisture.

One half pound of each of the above samples was then contacted with 15 pounds of water containing 15 ml of 10 percent phosphoric acid at 85° C. for 25 minutes and the excess water was drained therefrom. The pH of this mixture was about 5.8 to 5.9. Each of these samples was then compared with commercially available protein extrudates which were contacted with the aqueous solvent in the same manner. The effects of bulk density are shown in the following Table I.

TABLE I

| Sample | Bulk Density grams/liter | % Moisture drained wt | Shear[1] lbs | Mouthfeel |
|---|---|---|---|---|
| 1 | 114 | 83.8 | 319 | All samples 1–6 |
| 2 | 110 | 85.9 | 304 | have an excellent |
| 3 | 96 | 85.6 | 310 | fibrous, chewy, |
| 4 | 92 | 87.4 | 240 | juicy mouthfeel |
| 5 | 112 | 87.4 | 343 | with good bite & |
| 6 | 102 | 84.7 | 310 | elasticity. |
| A | 249 | 82.8 | 470 | Very coarse, dry. |
| B | 269 | 80.6 | 530 | Tough, flaky, dry. |

TABLE I-continued

| Sample | Bulk Density grams/liter | % Moisture drained wt | Shear[1] lbs | Mouthfeel |
|---|---|---|---|---|
| C | 367 | 76.2 | 530 | Tough, flaky, dry. |

[1]Shear strength was measured on the Allo-Kramer Shear Tester as a measure of the maximum stress the material can develop under the shearing force.
A Supro 50A, a commercially available soy protein extrudate from Ralston Purina Co.
B Vita Pro A-6, a commercially available soy protein extrudate from Lauhoff Co.
C ADM U-110, a commercially available soy protein extrudate from Archer Daniels Midland Co.

The data illustrated in the above table clearly shows that, by increasing the bulk density of the protein extrudate to much above about 200 grams per liter, a product is produced which has undesirable texture and dry mouthfeel as shown by the subjective mouthfeel qualities and supported by the increased shear strength and decreased moistures. It should be noted that the impartial sensory panel which evaluated mouthfeel qualities observed an undesirable soy note in all the commercial extrudate products treated in this example. Within the preferred range of about 90 to 115 grams per liter, the products had an excellent fibrous quality and a juicy meat-like mouthfeel and a bland flavor.

EXAMPLE 3

This example illustrates the effect of pH during aqueous solvent contact of the protein extrudate on mouthfeel qualities and toughness values of the protein extrudates.

Thirteen separate 10 pound batches of protein extrudate were prepared and contacted with the aqueous solvent in a similar manner as described in Example 1. To each batch of protein extrudate and aqueous solvent there was added sufficient 10 percent by weight phosphoric acid to adjust the aqueous mixture to a selected pH value between 3.7 and 6.4. After aqueous solvent contact, the protein extrudates were merely drained without squeezing, mouthfeel and toughness values were evaluated by an impartial sensory panel. The results obtained are found in the following Table II.

TABLE II

| pH of Aqueous Mixture | Toughness* Values | Mouthfeel |
|---|---|---|
| 3.7 | 9.0 | All samples at pH 3.7 to 4.2: hard, dry, rough surface; very dry and astringent; very cohesive, compacts when chewed; very tough and rubbery; very high bite resistance. |
| 4.0 | 8.5 | |
| 4.2 | 8.5 | |
| 4.4 | 6.5 | All samples at pH 4.4 to 4.8: dry rough surface; drying mouthfeel; cohesive; compacts when chewed; tough; high bite resistance. |
| 4.6 | 6.5 | |
| 4.8 | 6.0 | |
| 5.0 | 6.0 | Slightly rough surface; drying mouthfeel; cohesive; compacts when chewed; tough; spongy, good bite resistance. |
| 5.2 | 5.0 | Slightly rough surface; drying mouthfeel; cohesive; compacts slightly when chewed; slightly tough; grainy; good bite resistance. |
| 5.4 | 3.0 | Slightly rough surface; slightly juicy; good cohesiveness; good bite resistance; fibrous. |
| 5.7 | 2.5 | Very slight rough surface; juicy; good cohesiveness, tender, firm chew; good bite resistance; fibrous. |
| 5.9 | 2.0 | Soft surface; juicy; slight cohesiveness; spongy; good bite resistance, fibrous. |
| 6.1 | 0.5 | Samples at pH 6.1 and 6.3: soft slippery surface; mushy; no cohesiveness; very soft; very low bite resistance |
| 6.3 | 0.5 | |

*Toughness values were determined by the impartial sensory panel in the following manner. Panel members were asked to rank the samples in their amount of increasing toughness. This was done by assigning a number 9 to a sample having the most toughness and a number 0 to a sample having the least toughness and no bite resistance. Numbers between 0 and 9 were assigned to samples according to their relative amounts of toughness.

From the results shown in the above table, it will be observed that above a pH of about 6.0 the hydrated protein extrudate of this invention develops toughness values which are markedly decreased and which decrease in a dramatic nonlinear fashion with respect to pH change. Above about pH 6.0 the texture of the protein extrudates was consistently too soft and mushy to resemble meat. At a pH much below about 4.4 the protein extrudates were too dry and the texture was too tough, rubbery and chewy to resemble meat. Within the pH range from about 4.4 to 6.0, the products had desirable mouthfeel qualities and the texture was very similar to real meat. The most desirable balance between mouthfeel and toughness for texture similar to beef, pork, poultry or shellfish was observed at about pH 5.4 to 5.9. The most desirable balance between mouthfeel and toughness for texture similar to fish was observed at about pH 4.4 to 4.8.

A tuna fish analog was prepared from the above textured protein concentrate extracted at pH 4.4 to 4.8 by combining the following ingredients:
1700 grams textured protein concentrate; and
250 grams flavor, seasoning and fats.

These ingredients were mixed well, placed in a can and pasteurized at 185° F. for 60 minutes. These products were then compared with canned tuna. The products of this invention had a texture which was closely similar to natural canned tuna.

EXAMPLE 4

This example illustrates the effect of temperature on the extraction of particularly troublesome water soluble constituents such as flavoring components from the protein extrudate.

Three separate batches of protein extrudate were prepared and contacted with an aqueous solvent as described in Example 1. Each batch was extracted at a different temperature from 20° C. to 85° C. The results are found in the following Table III.

TABLE III

| Temperature | Flavor Evaluation |
|---|---|
| 20° C. | Strong soy flavor. |
| 65° C. | Mild soy note. |
| 85° C. | Bland flavor. |

The results in the above table illustrate that a temperature of above about 65° C. is required to produce an acceptable product. Optimum extraction is achieved at a temperature of at least about 85° C.

EXAMPLE 5

This example illustrates a counter-current extraction of water soluble constituents from the protein extrudate.

Four batches of soy protein extrudate as prepared in Example 1 were subjected to a simulated counter-current extraction using an aqueous solvent to solids ratio of 10 to 1. Each batch was solvent contacted four times with an aqueous solvent having a pH of about 5.6 to 5.7 for about 20 minutes at 85° C. To simulate counter-current extraction, the extracting liquid from a preceding batch was used to contact each next succeeding batch of extrudate and so on until each batch had been contacted four times. Fresh water adjusted to pH 5.6 to 5.7 was used in the last contact stage of each batch. A true counter-current extraction was achieved in the last batch to be solvent contacted. The protein extrudate pieces which emerged from the last batch were very bland in flavor and contained about 70 percent protein on a dry weight basis and about 86 moisture on a drained weight basis.

This example clearly shows that undesirable flavor components can be removed from protein extrudate using a counter-current extraction at a low aqueous solvent to solids ratio.

EXAMPLE 6

This example illustrates a comparison between the products produced by this invention and the prior art products produced by the processes described in U.S. Pat. Nos. 3,142,571 and 3,870,805 hereinafter respectively referred to as McAnelly and Hayes.

A protein product was prepared substantially in accordance with McAnelly in the following manner. Soybean flour (550 g of 65 mesh) was mixed for three minutes in a mixer with 450 g of water. The resulting dough was passed through a food grinder equipped with a ½ in plate to form strands. The resulting strands were placed on a screen in an autoclave. The temperature in the autoclave was raised to 121° C. with live steam. This temperature was maintained for 5 minutes. At the end of this time the pressure was released within 1.0 to 1.5 minutes. The thus cooked strands were chopped in a food chopper to obtain smaller pieces. About 100 g of the cooked, chopped strands were placed in a beaker containing 900 g of water heated to 82° C. The contents of the beaker were then stirred occasionally for 15 minutes and the water was poured off and replaced with an equal volume of fresh water at 82° C. Again the contents of the beaker were occasionally stirred for 15 minutes at which time the water was poured off and replaced with an equal volume of fresh water at 82° C. This water was allowed to remain in contact with the cooked pieces of product for 3 minutes. At the end of this time, the water was poured off and the product was drained without squeezing.

A second protein product was prepared substantially in accordance with Hayes using a single die extruder in the following manner. Defatted soy flour (200 pounds) of protein concentration of about 50 percent and 60 pounds of water were added to a blender. Sodium chloride (830 g), sodium hydroxide (290 g) and calcium chloride (830 g) were dissolved in one gallon of water and added to the blender. The material was heated to 120° F. and blended for 20 minutes. The resultant material was then introduced to a barrel-type extruder (a "Wenger X-25 model"). The heat assembly section of the extruder was designed as follows. One die was used having six 7/16 inch circular orifices located around the periphery of the die, each orifice having a length/diameter ratio equal to about 1.

The mixed material was fed to the extruder at a rate of about 350 pounds per hour. Additional water at the rate of about 60 pounds per hour was added to the mixed material in the extruder barrel. The retention time in the barrel of the extruder was about 10 seconds. The screw conveyor located inside the extruder barrel was operated at about 320 rpm. The temperature and pressure just ahead of the die was 135° C. and 200 psi, respectively. After passing through the die the mixture was discharged to the atmosphere.

The resulting extrudate (300 g) was slurried in 6 liters of water. The water was maintained at 82° C. for 5 minutes. The slurry was then placed in a centrifuge operated at 2000 Gs to remove excess water. The centrifuged product was again slurried in water, as before, and centrifuged.

The protein product of this invention was prepared substantially in accordance with Example 1 hereinafter referred to as TPC.

The bulk densities of each of the products, before aqueous leaching, were measured. The measured bulk densities are found in the following Table IV.

TABLE IV

| Product | Bulk Density at Zero Moisture, grams/liter |
|---|---|
| McAnelly | 447.2 |
| Hayes | 364.0 |
| TPC | 92.0 |

The above data clearly illustrates that the prior art products have much higher bulk densities than the products of the present invention.

The above-prepared hydrated protein products were evaluated for mouthfeel characteristics by an impartial sensory panel and both toughness and hardness were measured. The results obtained are found in the following Table V.

TABLE V

| Product | Hardness* (lbs) | Toughness** (lbs-in) | Mouthfeel |
|---|---|---|---|
| McAnelly | 111 | 1148 | Very soft, mushy, bread-like, no bite resistance, soggy and watery. |
| Hayes | 562 | 2670 | Nonhomogenous texture, some pieces tough and rubbery, some pieces mushy and mealy. |
| TPC | 377 | 1390 | Tender, fiberous, good bite resistance and elasticity, fine grained, porous, juicy. |

*Hardness was measured on an Instron texturometer using a 100 g sample as a measure of the maximum resisting force generated by the sample.
**Toughness was simultaneously measured on the Instron texturometer along with the hardness as the integrated area under the hardness curve. Toughness is thus the measure of the total work generated by the sample.

From the results shown in the above table, it is clear that the hydrated protein extrudate of this invention is dramatically different than the prior art products in mouthfeel hardness and toughness. The McAnelly product was too soft and too mushy to resemble meat. Hayes product was nonhomogenous, some pieces were too tough and too rubbery and other pieces were too soft and mushy to resemble the tender lean portions of meat. The product of this invention had very desirable homogeneous mouthfeel qualities and the texture was very similar to the tender lean cuts of meat.

What is claimed is:

1. In the process for preparing a textured protein concentrate from protein extrudate containing water soluble constitutents by the aqueous solvent extraction of said water soluble constituents from said extrudate, the improvement wherein said protein extrudate has a density of between about 85 to 150 grams per liter on a dry weight basis and the extraction is carried out at a pH of between about 4.4 and 6.0 and at a temperature above about 65° C., whereby a textured protein concentrate having improved meat-like texture and bland flavor is produced.

2. A proces according to claim 1, wherein the extraction is carried out at a pH between about 5.0 and 6.0 to obtain the textured protein concentrate having a texture similar to the tenter lean portions of beef, pork, poultry, or shellfish.

3. A process according to claim 2, wherein the extraction is carried out at a pH between about 5.4 and 5.9.

4. A process according to claim 1, wherein the extraction is carried out at a pH between about 4.4 and 5.0 to obtain the textured protein concentrate having a texture similar to fish.

5. A process according to claim 4, wherein the extraction is carried out at a pH between about 4.4 and 4.8.

6. A process according to claim 1, wherein a major portion of the water soluble consitituents are extracted from the protein extrudate to provide a textured protein concentrate having at least about 70 percent by weight protein.

7. A process according to claim 1, wherein the protein extrudate is in the form of pieces or chunks.

8. A process according to claim 1, wherein the protein extrudate has a density of between about 90 to 115 grams per liter on a dry weight basis.

9. A process according to claim 1, wherein the protein extrudate is contacted with the aqueous solvent at a solvent-to-solids ratio of at least 8 to 1 on a weight basis.

10. A process according to claim 7, wherein the protein extrudate is contacted in at least two stages with the aqueous solvent at a solvent-to-solids ratio of at least about 8 to 1 in one stage and of at least about 15 to 1 in a second stage and at a temperature at least about 85° C.

11. A process according to claim 1, wherein the protein extrudate has a density of between about 85 to 150 grams per liter on a dry weight basis and is prepared by extruding through an orifice, at a temperature between about 100° C. to 165° C. and a pressure between about 100 psi to 300 psi into a substantially atmospheric environment, a mixture of a proteinaceous material containing on a dry weight basis about 35 to 80 percent protein and about 15 to 50 percent water soluble constituents and about 9 to 18 percent water.

* * * * *